United States Patent [19]

Kendall et al.

[11] Patent Number: 4,730,599
[45] Date of Patent: Mar. 15, 1988

[54] RADIANT TUBE HEATING SYSTEM

[75] Inventors: Robert M. Kendall, Sunnyvale; John P. Kesselring, Mountain View, both of Calif.; Michael A. Lukasiewicz, Chicago, Ill.; John J. Lannutti, Saratoga; Richard J. Schreiber, San Jose, both of Calif.

[73] Assignee: Gas Research Institute, Chicago, Ill.

[21] Appl. No.: 903,584

[22] Filed: Sep. 4, 1986

[51] Int. Cl.⁴ .............................................. F24C 3/00
[52] U.S. Cl. ................................... 126/91 A; 431/7; 431/215; 431/328; 432/209
[58] Field of Search ................. 126/91 A; 431/7, 9, 431/11, 215, 243, 328; 432/209; 60/39.02, 39.06, 39, 511, 723; 422/171; 165/4, 10

[56] References Cited

U.S. PATENT DOCUMENTS

| | | | |
|---|---|---|---|
| 2,895,544 | 7/1959 | Parsons | 431/328 |
| 2,946,651 | 7/1960 | Houdry | 126/91 A X |
| 3,928,961 | 12/1975 | Pfefferle | 60/39.02 |
| 3,940,923 | 3/1976 | Pfefferle | 60/39.02 X |
| 4,154,568 | 5/1979 | Kendall et al. | 431/7 |
| 4,197,701 | 4/1980 | Boyum | 431/7 X |
| 4,204,829 | 5/1980 | Kendall et al. | 431/7 |
| 4,230,443 | 10/1980 | Berg et al. | 431/328 |
| 4,354,821 | 10/1982 | Kesselring et al. | 431/7 |
| 4,375,949 | 3/1983 | Salooja | 431/7 |
| 4,459,126 | 7/1984 | Krill et al. | 431/7 |

Primary Examiner—Margaret A. Focarino
Attorney, Agent, or Firm—Flehr, Hohbach, Test, Albritton & Herbert

[57] ABSTRACT

A gas-fired radiant tube that employs heterogeneous catalytic combustion, and a high combustion efficiency, low $NO_x$ catalytic combustion radiant tube heating system, incorporating the radiant tube, are disclosed. In the system, essentially mirror image, combined inlet/exhaust units containing heat regenerator units are connected at opposite ends of the catalytic combustion tube. Combustion flow is cycled back and forth through the units and the combustion tube so that during any given cycle the hot exhaust gases heat the regenerator in the exhaust side of the flow for preheating the inlet gases during the next, reversed flow cycle and the natural gas fuel is completely oxidized. Thus, the cycled flow completely consumes the fuel and constantly preheats inlet air so that the sytem provides both high combustion efficiency and high thermal efficiency.

5 Claims, 2 Drawing Figures

RADIANT TUBE HEATING SYSTEM

BACKGROUND OF THE INVENTION

The present invention relates to radiant tube heating systems and, in particular, to such a system which incorporates catalytic combustion and air preheating capabilities.

Radiant tube heating systems are used primarily for heat treating various fluids and materials, usually in a controlled ambient such as an inert gas or a vacuum. For example, Kendall et al U.S. Pat. No. 4,204,829 discloses a catalytic combustion tube heating system which provides radiant heating of a fluid heat sink, such as water, for extraction of the energy at an external heat exchanger.

However, to our knowledge, gas-fired radiant tube combustors employing high temperature heterogeneous catalytic combustion have not existed previously. Such a gas-fired radiant tube would be useful in many industrial process heating furnace applications. Presently, industrial process heating furnaces may typically employ conventional gas burners which fire into one end of a tube and, in particular, electric resistance elements, as sources of radiant heat. The electric resistance elements provide certain desirable operating characteristics including high temperatures (2,000° F. and above), precise temperature control and relatively high firing rates (Btu/hr).

A gas-fired radiant tube employing high temperature heterogeneous catalytic combustion would be highly desirable for such industrial process heating furnaces and other similar applications because of potential catalytic combustion advantages such as low emissions levels and uniform radiant energy transfer. However application of such gas-fired radiant tube combustors imposes the requirements of high combustion efficiency and high system thermal efficiency in addition to those of uniform radiant energy transfer and low emission levels.

To our knowledge, the radiant tube heating technology has not previously had available a simple catalytic combustion radiant tube heating system which efficiently satisfies the above requirements.

SUMMARY OF THE INVENTION

In view of the above discussion, it is a primary object of the present invention to provide a gas-fired radiant tube combustor employing high temperature heterogeneous catalytic combustion, the operation of which is characterized by uniform radiant energy transfer, low emission levels and high volumetric heat release rates.

It is another primary object of the present invention to provide a catalytic combustion, radiant tube heating system, the operation of which is characterized by high combustion efficiency and high thermal efficiency, as well as by uniform radiant energy transfer, and low $NO_x$ emission levels.

In one aspect, the above objectives are achieved in a catalytic combustion, gas-fired radiant tube comprising a ceramic tube having a combustion catalyst such as platinum coated on its inside surface for providing high temperature heterogeneous catalytic combustion.

In another aspect, the above objectives are achieved in a radiant tube heating system which incorporates a radiative catalytic combustion chamber, as described above, having a combustion flow path therethrough and a pair of substantially identical, inlet and outlet units which feed into opposite ends of the combustion flow path. Each inlet/exhaust unit comprises a conduit which is connected to the combustion chamber flow path, a fuel inlet, a heat regenerator, and an air inlet and an exhaust outlet which can be selectively opened and closed.

In a preferred method of operation, the two air inlets and the two exhaust outlets are selectively opened and closed so that air and fuel mixture from one inlet/exhaust unit is ignited and passed through the catalytic combustion chamber, then transmitted to the regenerator of the second inlet/exhaust unit and exhausted from that unit, thereby heating the second regenerator. The flow is then reversed through the system, from the second input/exhaust unit through the combustion chamber and then through the regenerator and the exhaust of the first unit. During this second, reversed-flow cycle, the previously-heated second regenerator preheats the inlet air prior to combustion, thereby increasing the combustion efficiency, while the first regenerator is heated by the exhaust flow preparatory to the initiation of the first cycle. In short, in each cycle of the two-cycle operation, the regenerator in the inlet side preheats the inlet air to increase combustion efficiency in that cycle, while the exhaust-side regenerator is heated preparatory to preheating the inlet air during the next, reverse-flow cycle.

Thus, the present catalytic combustion, gas-fired radiant tube and the associated reverse cycling system and process adapt radiant tube heating technology to the use of catalytic combustion and extract high combustion and thermal efficiency and provide uniform radiant energy transfer, while suppressing $NO_x$ emissions to low levels.

In a presently preferred embodiment, the two air inlets and the two exhaust outlets are controlled by valves which selectively open and close the associated inlet and exhaust paths. The valves can be manually operated. However, in systems where the cycle time is short, it is preferable to incorporate a timer-, or computer-, or controller-operated valving system.

BRIEF DESCRIPTION OF THE DRAWING

The above and other aspects of the invention are described in the drawings, in which.

DETAILED DESCRIPTION OF THE INVENTION

Figure 1:
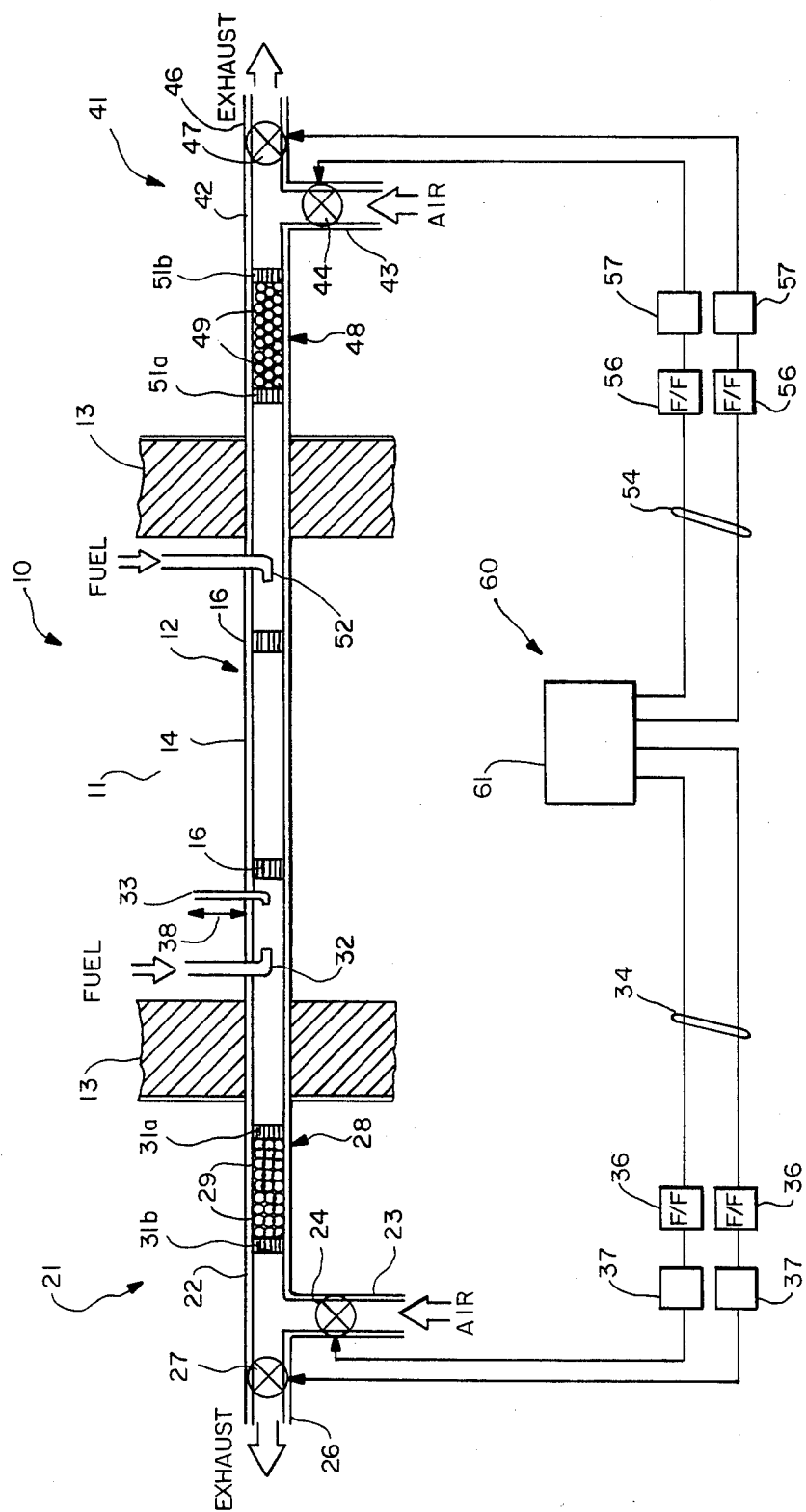
FIG. 1 schematically depicts a preferred embodiment of our dual preheating unit, catalytic combustion radiant thermal heating system.

Construction of Radiant Tube Heating System 10

As shown in the figure, our radiant tube heating system 10 comprises a radiant heating chamber 11 which includes a tube-type catalytic combustor 12 which extends through the insulated walls 13 of the chamber. Typically, the walls 13 are made of insulating material such as refractory brick. Radiant energy emitted from the combustor 12 is absorbed by heat sink material such as heat exchanger fluid or a metal "workpiece" (not shown) within the chamber 11, thereby heating the material. The chamber 11 may be provided with a controlled gaseous environment such as nitrogen or a vacuum for purposes such as heat treating a product. As shown, the tubular catalytic combustion chamber 12 may comprise a ceramic tube 14 coated with a layer of surface-active catalyst, e.g., a noble metal such as platinum and honeycombs 16—16 which are spaced within the tube 14 and are also coated with the catalyst. The choice of a particular catalyst material depends upon the desired application and its operating conditions and requirements.

In a presently preferred working embodiment, our tube-type catalytic combustor 12 comprised a twenty-two inch long, 1.75 inch outside diameter, thin walled ceramic (silicon carbide) tube that was coated on its inside surface with a platinum combustion catalyst. The operational characteristics of this combustor 12 were demonstrated by a series of tests in which a near stoichiometric (91% TA to 130% TA) mixture of natural gas and preheated air (preheated to 830° F. to 1060° F.) was passed through the tube. The reactants burned catalytically on the inside surface of the tube wall, which caused the tube wall to be heated to almost 2000° F. The operational parameters and the results are summarized in the accompanying table.

achieved without heat recuperation and at this relatively low combustion efficiency.

Figure 2:
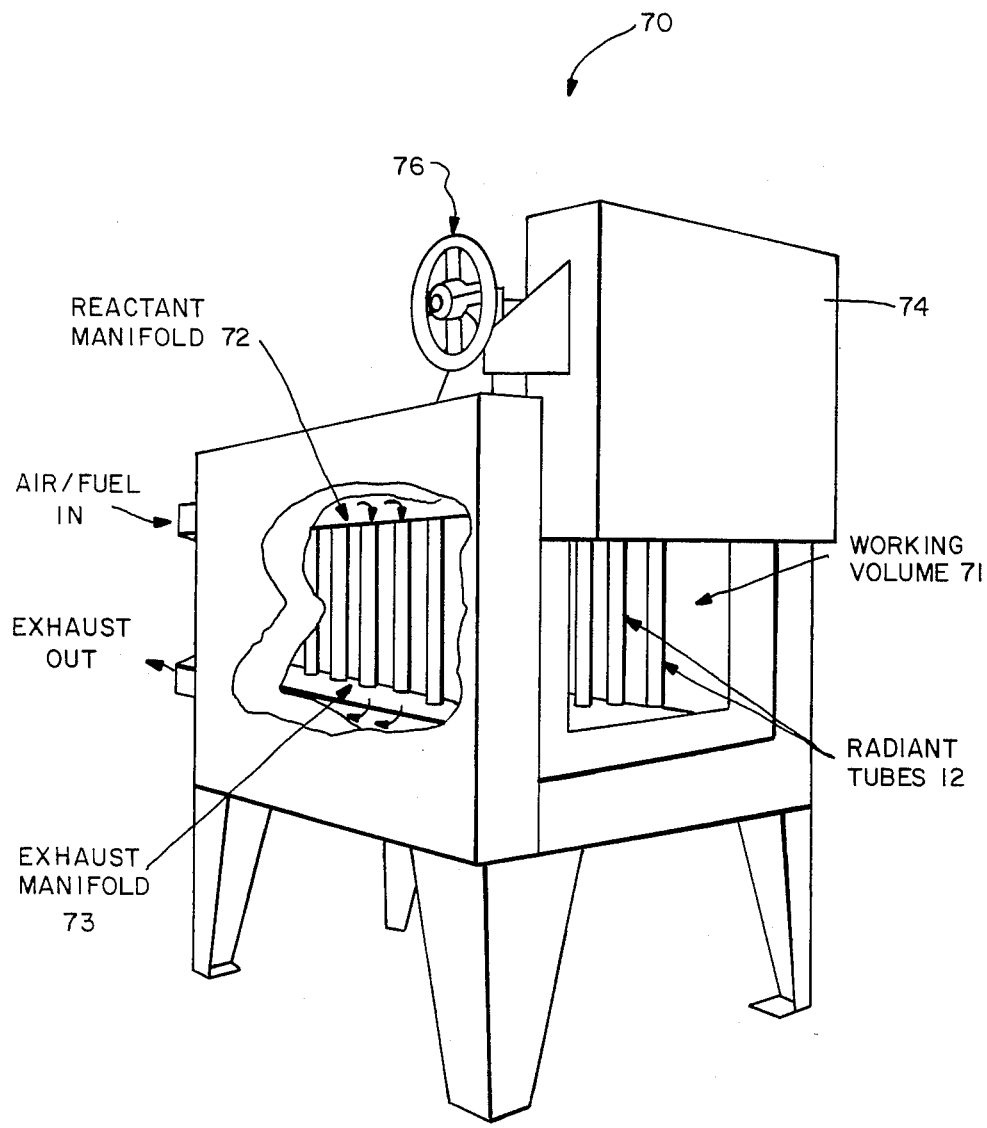
FIG. 2 schematically depicts a box furnace which employs the gas-fired radiant tubes of the present invention.

FIG. 2 depicts application of the above-described catalytic tubes 12 in a 120 kW (400 MBtu/hr) standard box-type furnace 70 having a five foot long working space or chamber 71. The tubes 12—12 are positioned vertically against the side walls of the working chamber 71 and are connected between an upper reactant inlet manifold 72 and a lower exhaust manifold 73. Access is provided to the chamber by a door 74 which is raised and lowered by a wheel-actuated lift mechanism 76. In this exemplary box furnace, twenty tubes approximately two feet long and 1.5 inches in diameter and spaced evenly apart on six inch centers would each release heat at the rate of 20 MBtu/hr (at a heat flux density of about 25 MBtu/hr-ft$^2$), which would generate the required furnace power of about 120 kW (400 MBtu/hr). Quite obviously, these figures are given by way of example only and the size of the furnace, number of tubes, etc., will be varied in accordance with the particular power requirements for a given application.

As mentioned above, the excellent heat flux density

SUMMARY OF TEST RESULTS

| | INDEPENDENT VARIABLES | | | | | | | |
|---|---|---|---|---|---|---|---|---|
| Tube (Coating) | Preheat Temperature (°F.) | Firing Rate (MBtu/hr) | Stoichiometry (% TA) | O2 (%) | CO2 (%) | Emissions UHC (ppm × 10$^3$) | CO (ppm) | DEPENDENT VARIABLES Temperatures |
| Platinum | 830 | 23.5 | 130 | 13.8 | 3.3 | 45 | 61 | 1945 |
| | 1060 | 23.5 | 91 | 7.5 | 4.5 | 65 | 3.8% | 1958 |
| | 879 | 23.5 | 121 | 12.5 | 4.2 | 47 | 200 | >1999 |
| | 948 | 24.7 | 101 | 10.0 | 5.5 | 50 | 195 | >1999 |
| | 950 | 25.8 | 97 | 9.5 | 5.1 | 54 | 200 | >1999 |

One of the most important results was the demonstration of the attainment of self-sustaining high temperature (2000° F.) incandescent radiant operation in the silicon carbide tube 12. The radiant condition was caused solely by the conduction of heat from the catalytic surface combustion of natural gas and air on the inside surface of the tube and achieved a surface heat flux density of from 15 to 30 MBtu/hr-ft$^2$ (30 to 61 W/in$^2$). This is comparable to the flux density of existing ceramic electric resistance units, which produce about 22 to 37 MBtu/hr-ft$^2$ (45 to 75 W/in$^2$) in furnaces rated at 2200° F. The heat flux density of our catalytic tube in fact exceeded that of existing gas-fired radiant tubes, which produce typical flux densities of 6 to 8 MBtu/hr-ft$^2$ (12 to 16 W/in$^2$).

Secondly, the gas temperature rise through the tube 12 was only about 200° F. This is desirable because it indicates that heterogeneous (i.e., catalytic surface) combustion dominated over homogeneous (conventional flame-type) combustion. The outlet temperature of about 1200° F. would have been much higher (probably closer to the 2000° F. wall temperature) if the bulk gases had been reacting. Instead the fuel that was consumed was burned on the catalytic surface. This translates into lower NO$_x$ emissions (due to the lower combustion temperature) and lower pressure drop across the tube (i.e., <0.5 inches w.c., due to the absence of a flame front).

Thirdly, the combustion efficiency, that is, the percentage of the fuel that was burned, was about fifty percent, which is a higher percentage than had been predicted by computer models. It is significant to note that the above-described heat flux densities were has been achieved for radiant tube 12 at relatively low combustion efficiencies of about fifty percent. Referring again to FIG. 1, in a presently preferred system embodiment, our radiant tuve includes (1) downstream catalyst coated honeycomb monoliths 31a and 51a which consume the fuel that remains after the reactants pass over the tube surface, (2) heating elements or regenerators 29 and 49 which recover heat in the exit gas and (3) a dual inlet/exhaust unit construction which permits recycling preheating operation. As described below, the overall construction and operation of system 10 including the honeycombs, the regenerators and the recycling feature, permits catalytic-tube heating system combustion efficiency of nearly one hundred percent and seventy--eighty percent thermal efficiency.

In system 10, the reverse-flow cycling system comprises a pair of inlet-exhaust units 21 and 41. The inlet-/exhaust units 21 and 41 include tubes or conduits 22 and 42, respectively, which communicate with the catalytic combustor 12 at opposite ends of the tube 14. In the illustrated embodiment, the tubes 22, 14, 42 can be conveniently formed as a unitary, continuous tube or, alternatively, can be formed as separate tubes which are joined.

Considering now the construction and operation of inlet/exhaust unit 21, tube 22 includes an air inlet 23 and an exhaust 26. Inlet 23 is connected to a source of pressurized air (not shown). Air flow into the main tube 22 and exhaust flow from the main tube are controlled, respectively, by valves 24 and 27. The main conduit 22 also includes a regenerator unit 28 comprising the regenerators or heating elements 29 of a suitable temperature-resistant material such as ceramic spheres or pellets which are positioned between the coated and uncoated honeycomb end units 31a and 31b, respectively. As mentioned, the regenerator 28 is heated by hot exhaust gases during one cycle and in turn preheats the incoming air stream during the succeeding, reverse flow cycle. Fuel is added to the inlet air flow by an inlet jet 32 which is adjacent opposed-jet igniter 33 of the left side of furnace 11.

Inlet/exhaust unit 41 is essentially identical to unit 21 and includes a main conduit or tube 42; a pressurized air inlet 43 and an exhaust conduit 46; inlet and exhaust valves 44 and 47; regenerator 48, comprising heating elements 49 and uncoated honeycomb ends 51; and fuel injector 52. A suitable ignition system such as a pilot flame jetting from an igniter at the right side of furnace 11 can be provided for unit 41, in addition to the igniter 33 provided for unit 21. However, ignition normally is required only once during each operation sequence and each operation sequence can be started using unit 21 in its inlet mode and 41 in its exhaust mode. Thus, only the single igniter 33, for unit 21, is required. After start-up, the igniter 33 can be withdrawn from the main flow stream, as indicated by arrow 38.

When the time, $\Delta t$, for each combustion cycle is sufficiently long, it may be convenient to use manually-operated valves 24, 27, 44 and 47. Alternatively, and in particular where the cycle time $\Delta t$ is relatively short, it is convenient to use solenoid-controlled valves and to incorporate a timing circuit, such as that illustrated at 60, for automatically opening and closing the valves 24, 27, 44 and 47 to initiate and terminate each cycle. Each cycle time $\Delta t$ is predetermined in accordance with factors such as the rate of inlet air flow, the heat capacity/retention of the regenerators 28 and 48 and the operating temperature.

In the simplified timing control circuit 60 shown in the figure, a conventional electronic timer 61 applies control signals over output lines or buses 34 and 54 at intervals $\Delta t$ to set and reset flip-flops 36 and 56. The flip-flops selectively turn on and off power transistors 37 and 57 to open and close valves 24, 27, 44 and 47. Of course, various ether control circuits using dedicated microprocessors, computers or controller units can be used. Also, depending upon the size of the system 10 and the size of the various inlet and exhaust conduits, it may be desirable to use larger valve means such as gate valves or to use vanes or other types of flow control devices.

Operation of Radiant Tube Heating System 10

During the initial cycle, inlet/exhaust unit 21 is set in the inlet mode and inlet/exhaust unit 41 is in the exhaust mode. These modes are implemented by setting the valves or vanes 24 and 47 open and 27 and 44 closed, either manually, or automatically using control circuit 60. Air flows through the open inlet valve 23, regenerator 28, and past fuel inlet 32 and igniter 33 into the tubular combustion chamber 12. The gaseous combustion products from the combustion chamber then flow through regenerator unit 48 and are exhausted through open exhaust valve 47. At the start of this initial cycle, fuel is added at and ignited by opposed-jet igniter 33, creating a bow flame which forms upstream of the igniter and heats the tubular combustion chamber 12, (i.e., heats the honeycombs 16—16 and the tube 14). When the chamber reaches a desired operating temperature (for example, 1600° F.), fuel is added via inlet jet 32 and the igniter 33 is turned off and retracted from the stream as indicated by arrow 38. The flows of fuel and air are continued for the cycle time, $\Delta t$, maintaining the combustion and thereby heating the chamber 11 and the heat sink material therein and heating the second regenerator 48 in the hot exhaust flow.

At the end of this first cycle, at $t = \Delta t$, the gas flow through the system 10 is reversed by opening valves 44 and 27 and closing valves 24 and 47 to set the inlet/exhaust unit 41 in the inlet mode and the inlet/exhaust unit 21 in the exhaust mode. During this second, reversed flow cycle, inlet air from the open valve 44 is preheated by the previously heated regenerator unit 48 and passes fuel inlet 52, where fuel is added. Then, the air and fuel mixture enters the tubular combustion chamber 12 and undergoes combustion and the gaseous combustion products flow through the first regenerator unit 28 and are exhausted through the open exhaust valve 27.

During this second cycle, the hot exhaust gases heat the first regenerator unit 28 preparatory to reversing the flow at $t = 2\Delta t$ and starting another cycle. Thus, during each cycle of the two-cycle operation after the first cycle, the previously heated inlet side regenerator preheats the incoming air stream and the exhaust side regenerator is heated by the exhaust gases. These alternating cycles provide a continuous supply of preheated air that ensures a high combustion efficiency, high thermal efficiency operation for the catalytic combustion chamber 12. In short, the construction of the chamber 12 and the two-cycle reverse flow system and operation thereof achieve the four critical objectives of high combustion efficiency, high system thermal efficiency, uniform radiant energy transfer, and low emission levels of combustion products such as $NO_x$.

The foregoing description of the preferred and alternative embodiments of our invention is presented for purposes of illustration and description. It is not intended to be exhaustive or to limit the invention to the precise form disclosed. Obviously, modifications and variations will be possible to those of usual skill in the art in light of the above teachings. The preferred embodiment was chosen and described in order to best explain the principles of the invention and its practical application and to thereby enable others skilled in the art to best utilize the invention and various embodiments and with various modifications as are suited to the particular use contemplated. It is thus intended that the scope of the invention be defined only by the claims which follow.

What is claimed is:

1. A radiant tube heating system comprising: (1) a tubular catalytic combustion chamber having first and second orifices defining a combustion flow path therethrough; (2) fuel inlet means for injecting fuel into the combustion flow path; (3) first and second combined inlet and exhaust units each of which comprises a conduit, said conduit of the first unit communicating with said first orifice and said conduit of the second unit communicating with said second orifice, each of said conduits further comprising heat regenerator means, inlet means for selectively opening and closing fluid communication between a source of gas under pressure and said combustion chamber and outlet means for selectively opening and closing an exhaust path for discharge of products of combustion from the combustion chamber; (4) means for igniting the fuel with the gas in the combustion chamber; and (5) control means for operating the inlet and outlet means in a cycle which includes a first phase with the first unit having its inlet means open and its outlet means closed while concurrently the second unit has its inlet means closed and its outlet means open, and a second phase in which the first unit has its inlet means closed and its outlet means open while concurrently the second unit has its inlet means open and its outlet means closed, said control means in the first phase directing the flow in a direction from the inlet of the first unit to the outlet of the second unit and in the second phase directing the flow in a direction from the inlet of the second unit to the outlet of the first unit.

2. A radiant tube heating system as in claim 1 in which said first and second orifices define a bidirectional flow path therebetween, means forming first and second high heat capacity flow path segments communicating with respective orifices, and said means for cycling said inlet and outlet means directs the flow of combustion gases in a first phase in a direction from the combustion chamber for exhaust through the first high heat capacity flow path segment and in a second phase causes reversal of the flow in a direction of the gases from the combustion chamber for exhaust through the second high heat capacity flow path segment with the associated segments being preheated by the products of combustion during one of the phases with the inlet gases being preheated by the segments during the flow reversal in the other phase.

3. A radiant tube heating system comprising: (1) a tubular catalytic combustion chamber having first and second orifices defining a combustion flow path therethrough; (2) first and second combined inlet and exhaust units, each unit comprising a conduit communicating, respectively, with said first orifice and said second orifice and comprising, disposed serially along said conduit, a fuel inlet, heat regenerator means, a gas inlet connected to a source of gas under pressure and including valves for selectively opening and closing thereof to admit said gas under pressure to the catalytic combustion chamber, and a gas exhaust including valves for selectively opening and closing thereof, and means for first, opening, and second, closing, said first valve inlet and second exhaust valve and simultaneously first, closing, and second, opening, said inlet valve and first exhaust valve; and (3) means for igniting the gas in at least said first unit; whereby cycling said inlets and exhausts open by way of (a) first, opening and, second, closing said first gas inlet and said second gas exhaust and at the same time (b) first, closing and, second, opening said second gas inlet and first gas exhaust, directs the combustion flow back and forth through the combustion chamber for preheating inlet gases at one heat regenerator means prior to combustion and heating the other regenerator preparatory to preheating inlet gas during the next, reverse flow phase.

4. A radiant tube heating system as in claim 3 wherein said catalytic combustion chamber comprises catalyst-coated honeycomb material.

5. The radiant tube heating system of claim 1, wherein said catalytic combustion chamber comprises catalyst-coated honeycomb material.

* * * * *